(12) United States Patent
Kari et al.

(10) Patent No.: US 12,311,954 B2
(45) Date of Patent: May 27, 2025

(54) METHOD AND SYSTEM FOR ROBUST IDENTIFICATION OF A VEHICLE OCCUPANT

(71) Applicant: Dr. Ing. h.c. F. Porsche Aktiengesellschaft, Stuttgart (DE)

(72) Inventors: Mohamed Kari, Essen (DE); David Bethge, Stuttgart-Feuerbach (DE); Satiyabooshan Murugaboopathy, Dresden (DE)

(73) Assignee: Dr. Ing. h.c. F. Porsche Aktiengesellschaft (DE)

(*) Notice: Subject to any disclaimer, the term of this patent is extended or adjusted under 35 U.S.C. 154(b) by 435 days.

(21) Appl. No.: 17/967,019

(22) Filed: Oct. 17, 2022

(65) Prior Publication Data

US 2023/0147024 A1  May 11, 2023

(30) Foreign Application Priority Data

Nov. 9, 2021  (DE) .................... 10 2021 129 103.8

(51) Int. Cl.
*B60W 40/08* (2012.01)
*G06N 3/045* (2023.01)

(52) U.S. Cl.
CPC .............. *B60W 40/08* (2013.01); *G06N 3/045* (2023.01); *B60W 2420/403* (2013.01); *B60W 2420/408* (2024.01); *B60W 2540/043* (2020.02)

(58) Field of Classification Search
CPC ........... B60W 40/08; B60W 2420/403; B60W 2420/408; B60W 2540/043;
(Continued)

(56) References Cited

U.S. PATENT DOCUMENTS 11,518,277 B2* 12/2022 Bove ..................... B60R 16/037
11,590,929 B2*  2/2023 Bhattacharya ....... G05B 13/027
(Continued)

FOREIGN PATENT DOCUMENTS

DE    102020125978 A1    4/2021
WO      2016005378 A1    1/2016
WO      2021043834 A1    3/2021

OTHER PUBLICATIONS

Andrew et al., "Deep Canonical Correlation Analysis", Proceedings of the 30th International Conference on Machine Learning, Atlanta, GA, 2013, PMLR 28(3):1247, retrieved from the internet Sep. 15, 2022, https://dl.acm.org/doi/10.5555/3042817.3043076, 9 pages.
(Continued)

*Primary Examiner* — Michael S Osinski
(74) *Attorney, Agent, or Firm* — Buchanan Ingersoll & Rooney PC

(57) ABSTRACT

A method for robust identification of a vehicle occupant. Simultaneously acquired data pairs from interior sensors and sensing elements are used as a training data set for global learning of a Deep Canonical Correlation Analysis architecture with two neural networks, wherein an authentication of the respective vehicle occupants from the group of vehicle users is carried out in a first step as an initialization. In a second step or a subsequent use, only one of the two sensing elements is then needed to identify the respective vehicle occupant. Also described is a system, via which the robust identification is provided by way of the method.

11 Claims, 1 Drawing Sheet

(58) Field of Classification Search
CPC ... B60W 2540/221; B60W 2040/0872; B60W 2540/229; G06N 3/045; G06N 3/09; B60R 25/25; G06F 21/32; G06V 10/82; G06V 20/59; G06V 20/597; G06V 40/172; G06V 20/58; G06V 40/20; G06V 10/25; G06V 20/52; G06V 20/593

See application file for complete search history.

(56) References Cited

U.S. PATENT DOCUMENTS

| | | | | |
|---|---|---|---|---|
| 11,743,719 | B2* | 8/2023 | Kashani | H04L 63/102 |
| 11,830,290 | B2* | 11/2023 | Coleman | G07C 5/0841 |
| 11,970,187 | B2* | 4/2024 | Stumpf | G01C 21/3415 |
| 12,059,955 | B2* | 8/2024 | Brunbäck | B60W 40/08 |
| 12,124,547 | B2* | 10/2024 | Takada | G06V 40/50 |
| 12,135,761 | B2* | 11/2024 | Weisel | G06V 10/82 |
| 2012/0016827 | A1* | 1/2012 | Evans | G07C 9/37 706/14 |
| 2014/0266623 | A1* | 9/2014 | Graumann | B60K 28/02 340/10.1 |
| 2018/0247037 | A1* | 8/2018 | Weller | G06F 21/32 |
| 2021/0094492 | A1* | 4/2021 | Zender | G06V 40/70 |
| 2021/0105619 | A1 | 4/2021 | Kashani et al. | |
| 2022/0148328 | A1* | 5/2022 | Ye | G06V 10/82 |
| 2022/0366666 | A1* | 11/2022 | Sun | G06N 3/045 |
| 2022/0375265 | A1* | 11/2022 | Chan | G06T 7/20 |
| 2023/0004745 | A1* | 1/2023 | Fulop | G06V 40/28 |
| 2023/0040513 | A1* | 2/2023 | Ryan | G06V 20/52 |
| 2023/0196093 | A1* | 6/2023 | Bhardwaj | G06N 3/082 706/25 |
| 2024/0112677 | A1* | 4/2024 | Mayer | A61B 5/6893 |
| 2025/0018957 | A1* | 1/2025 | Böhmer | G06V 20/597 |

OTHER PUBLICATIONS

Dumpala et al., "Audio-Visual Fusion for Sentiment Classification using Cross-Modal Autoencoder", 32nd Conference on Neural Information Processing System, Montreal, Canada, 2018, retrieved from the internet Jul. 15, 2022, https://nips2018vigii.github.io/static/papers/accepted/19.pdf, 8 pages.

Kagawade et al., "Fusion of Frequency Domain Features of Face and Iris Traits for Person Identification", J. Inst. Eng. India Ser. B, Oct. 2021, 102(5):987-996, retrieved from the internet Jul. 15, 2022, https://link.springer.com/content/pdf/10.1007/s40031-021-00602-9.pdf, 10 pages.

Liu et al., "Multimodal Emotion Recognition Using Deep Canonical Correlation Analysis", arXCiv, 2019, retrieved from the internet Jul. 15, 2022, https://arxiv.org/pdf/1908.05349.pdf, 16 pages.

\* cited by examiner

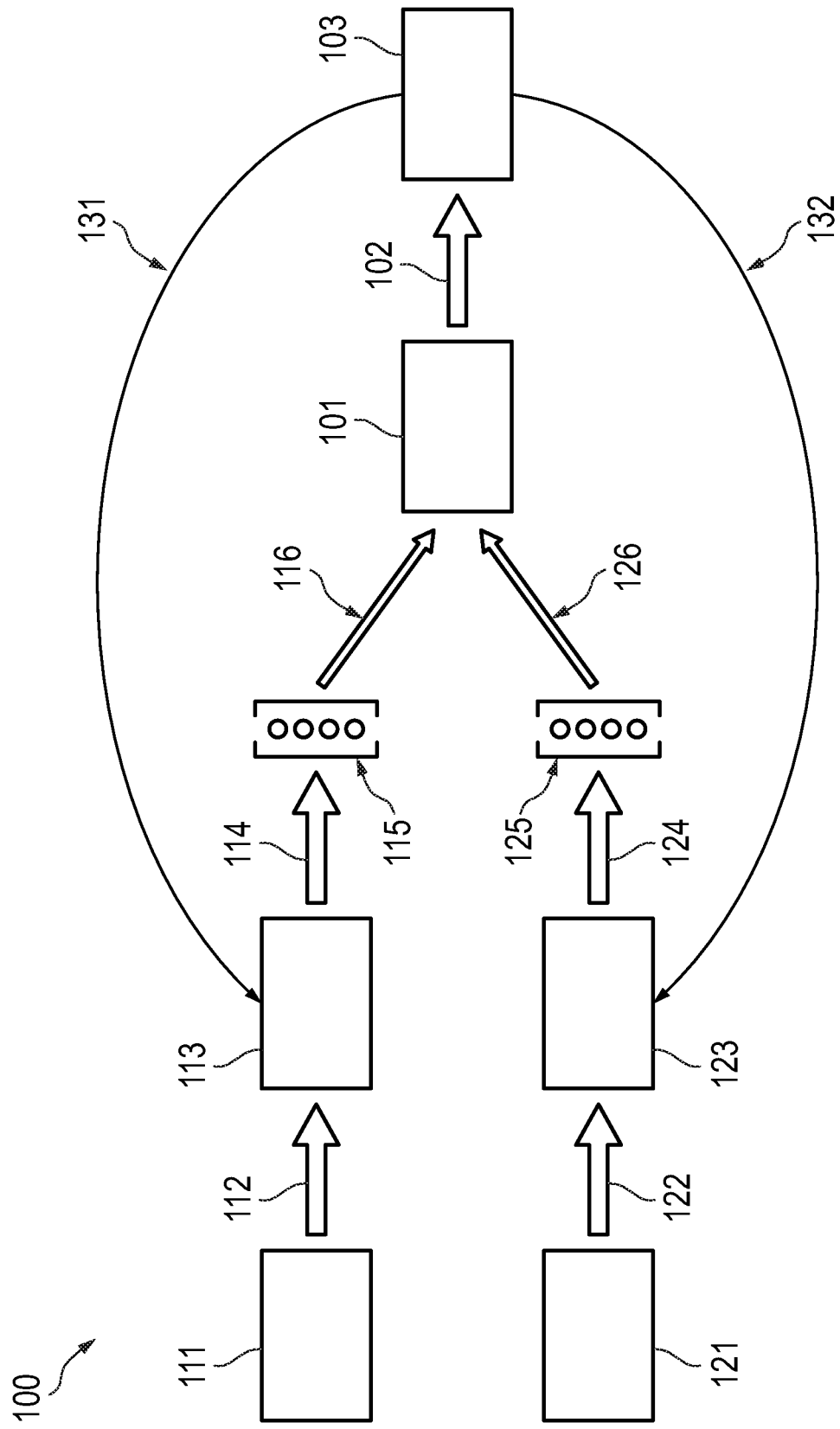

METHOD AND SYSTEM FOR ROBUST IDENTIFICATION OF A VEHICLE OCCUPANT

CROSS-REFERENCE TO RELATED APPLICATION

This application claims priority to German Patent Application No. 10 2021 129 103.8, filed Nov. 9, 2021, the content of such application being incorporated by reference herein in its entirety.

FIELD OF THE INVENTION

The present invention relates to a method for robust identification of a vehicle occupant using interior sensors. A corresponding apparatus and a corresponding system are described as well.

BACKGROUND OF THE INVENTION

Nowadays, many user-specific settings of operating elements in a vehicle are managed by a vehicle system and automatically executed by the vehicle system at his or her seat when the vehicle occupant is identified. In order for the identification of the vehicle occupant to also be automated, the vehicle system uses sensors, which are disposed in the interior and are generally based on the acquisition of physiological characteristics and images, in particular from a camera. Problems arise when a sensor fails and the vehicle occupant can no longer be automatically identified. For image acquisition systems, this is in particular the case when there is not enough light, e.g., when it gets dark or at night.

WO 2016/005378 A1, which is incorporated by reference herein, discloses a method for identifying a vehicle occupant, in which at least a first parameter is acquired at a first point in time and a second parameter is acquired at a second point in time in order to reliably link a user profile to the corresponding person. The first parameter is analyzed to carry out the identification prior to the second point in time. The parameters include physiological-biometric data and/or biometric behavior data and/or usage analyses. The link can be updated dynamically using a self-learning algorithm.

WO 2021/043834 A1, which is incorporated by reference herein, discloses a management system for the identification and biomonitoring of a user of a vehicle, wherein the management system comprises a person-related module for acquiring personal data of the user and for identifying the user, e.g., a mobile pulse sensor, and a vehicle-related module for accessing at least one vehicle component, e.g., a camera. Based on a data exchange between the vehicle-related and the person-related module, a change to the at least one vehicle component is allowed.

DE 10 2020 125 978 A1, which is incorporated by reference herein, discloses a method and system for a motor vehicle for authenticating an occupant, whereby at least facial information is available. The occupant can be identified using the facial information in combination with different other sensor data, in particular speech recognition data or biometric data.

SUMMARY OF THE INVENTION

In light of this, described herein is a method for identifying vehicle occupants, in which a respective vehicle occupant is identified by a vehicle system via sensors disposed in the vehicle interior. Identification should be possible even if a sensor fails.

To achieve the aforementioned task, a method for robust identification of vehicle occupants is proposed, in which a first interior sensor and a second interior sensor are disposed in a vehicle interior. To identify a respective vehicle occupant among a group of vehicle users, a Deep Canonical Correlation Analysis method is carried out with a first neural network associated with the first interior sensor and a second neural network associated with the second interior sensor. The first neural network and the second neural network have a symmetrical structure with at least three hidden layers and are each determined by a plurality of network parameters. A respective data vector from a respective measuring operation of the first interior sensor and the second interior sensor is formed as a respective input for the respective neural network. A respective representation is issued by the respective neural network as a respective output. A loss function is formed via a correlation between the respective representations, wherein the loss function is minimal when the correlation is maximum. In a first step serving as an initialization, each vehicle occupant from the group of vehicle users is authenticated against the output of the respective neural networks by

- providing a respective pair of data vectors as a respective input for each vehicle occupant in a predetermined number of training runs by means of a respective simultaneous measuring operation by the first interior sensor and the second interior sensor, and thereby
- optimizing the plurality of network parameters of the respective neural networks with regard to a minimum value of the loss function by means of a gradient-based process, and,
- after completion of the training runs, recalculating the representations of the output for all data vector pairs with the now optimized network parameters, forming a respective averaged representation and storing the respective averaged representation in a user account associated with the respective vehicle occupant.

In a second step serving as a productive use, the respective vehicle occupant is identified by

- providing at least one data vector of the data vector pair as an input to the respective associated trained neural network via a respective measuring operation carried out each time the vehicle occupant reenters the interior of the vehicle, and
- identifying the respective vehicle occupant by comparing the at least one output with the respective averaged representations stored in the user accounts.

The method according to aspects of the invention advantageously uses the Deep Canonical Correlation Analysis method, e.g., described in "Galen Andrew, Raman Arora, Jeff Bilmes, Karen Livescu, Proceedings of the 30th International Conference on Machine Learning, PMLR 28(3): 1247-1255, 2013", which is incorporated by reference herein in its entirety.

A gradient-based backpropagation to optimize the neural networks or the plurality of network parameters is carried out. The loss function, which is designed in terms of correlations of the output, produces a multidimensional reference data set (from averaged representations), which enables reliable identification of the respective vehicle occupant even in the event of a failure of the first interior sensor or the second interior sensor and the associated failure to provide a dimension in the pair of data vectors.

In the first step, a number range between 10 and 20 for the predetermined number of training runs has proven to be sufficient for a successful identification of the respective vehicle occupant in the second step.

According to aspects of the invention, simultaneously acquired data pairs from sensors or sensing elements disposed in the vehicle interior are used as a training data set for global learning of a Deep Canonical Correlation Analysis architecture with two neural networks, wherein an authentication of the respective vehicle occupants from the group of vehicle users is carried out in a first step as an initialization. The two trained neural networks formed from this can also be referred to respectively as encoders for a domain assigned to the respective sensor. In a second step or a subsequent use, only one of the two sensing elements is then needed to identify the respective vehicle occupant. It is also conceivable to use the method according to aspects of the invention in any environment (independent of a vehicle or vehicle interior) that is monitored by a plurality of different sensors.

In one embodiment of the method according to aspects of the invention, the first interior sensor is selected as a sensor for acquiring image data for the respective vehicle occupant. It is conceivable for data or image data from more than one sensor to be fed to the first neural network combined in a single data vector.

In a continued embodiment of the method according to aspects of the invention, the first interior sensor is selected from the following list: camera or interior camera, infrared camera, radar.

In a further embodiment of the method according to aspects of the invention, the second interior sensor is selected as a sensor for acquiring physiological data from the respective vehicle occupant.

In a continued further embodiment of the method according to aspects of the invention, a physiological characteristic to be acquired by the second interior sensor is selected from the following list: eye-blink observation, heart rate, respiration, breath analysis, holding force exerted on the steering wheel, seat occupancy detection. The heart rate can be measured using an electrocardiogram sensor of a smartwatch, for example, whereby the smartwatch is in wireless communication with the vehicle system. A seat occupancy detection can be carried out using piezo elements disposed in the respective car seat, for example. It is also conceivable that the wireless connection to a terminal device of the respective vehicle occupant, e.g., Bluetooth, can be used for localization or seat assignment.

A system for robust identification of vehicle occupants, in which an identification control device, a first interior sensor and a second interior sensor are disposed in a vehicle interior, is described as well. The identification control device is configured to carry out a Deep Canonical Correlation Analysis method with a first neural network associated with the first interior sensor and a second neural network associated with the second interior sensor to identify a respective vehicle occupant among a group of vehicle users. The first neural network and the second neural network have a symmetrical structure with at least three hidden layers and are each determined by a plurality of network parameters. A respective data vector from a respective measuring operation of the first interior sensor and the second interior sensor is formed as a respective input for the respective neural network. The respective neural network is configured to issue a respective representation as a respective output. The identification control device is configured to form a loss function via a correlation between the respective representations, whereby the loss function is minimal when the correlation is maximum. The identification control device is further configured to authenticate each vehicle occupant from the group of vehicle users against the output of the respective neural networks in a first step serving as an initialization by provinding a respective pair of data vectors as a respective input for each vehicle occupant in a predetermined number of training runs by means of a respective simultaneous measuring operation by the first interior sensor and the second interior sensor, and thereby optimizing the plurality of network parameters of the respective neural networks with regard to a minimum value of the loss function by means of a gradient-based process, after completion of the training runs, recalculating the representations of the output for all data vector pairs with the now optimized network parameters, forming a respective averaged representation and storing the respective averaged representation in a user account associated with the respective vehicle occupant.

The identification control device is further configured to identify the respective vehicle occupant in a second step serving as a productive use by providing at least one data vector of the data vector pair as an input to the respective associated trained neural network via a respective measuring operation carried out each time the vehicle occupant reenters the interior of the vehicle, and identifying the respective vehicle occupant by comparing the at least one output with the respective averaged representations stored in the user accounts.

In one embodiment of the system according to aspects of the invention, the first interior sensor is selected as a sensor for acquiring image data for the respective vehicle occupant.

In a continued embodiment of the system according to aspects of the invention, the sensor for acquiring image data is selected from the following list: camera, infrared camera, radar.

In a further embodiment of the system according to aspects of the invention, the second interior sensor is selected as a sensor for acquiring physiological data from the respective vehicle occupant.

In a continued further embodiment of the system according to aspects of the invention, a physiological characteristic to be acquired by the second interior sensor is selected from the following list: eye-blink observation, heart rate, respiratory activity, breath analysis, holding force exerted on the steering wheel, seat occupancy.

A computer program product comprising a computer-readable medium on which a program code that can be executed on a computing unit of an identification control device of a vehicle is stored is furthermore described as well. When executed on the computing unit, the program code prompts the computing unit to carry out at least one of the following steps based on a Deep Canonical Correlation Analysis method:

forming a first neural network and a second neural network having a symmetrical structure and at least three hidden layers, each determined by a plurality of network parameters;

assigning a respective data vector from a respective measuring operation of a first interior sensor to the first neural network and a second interior sensor to the second neural network as a respective input;

forming a respective output of the respective neural network as a respective representation;

forming a loss function via a correlation between the respective representations, wherein the loss function is minimal when the correlation is maximum;

authenticating each vehicle occupant from the group of vehicle users against the output of the respective neural networks within the context of an initialization by
providing a respective pair of data vectors as a respective input for each vehicle occupant in a predetermined number of training runs by means of a respective simultaneous measuring operation by the first interior sensor and the second interior sensor, and thereby
optimizing the plurality of network parameters of the respective neural networks with regard to a minimum value of the loss function by means of a gradient-based process,
after completion of the training runs, recalculating the representations of the output for all data vector pairs with the now optimized network parameters, forming a respective averaged representation and storing the respective averaged representation in a user account associated with the respective vehicle occupant,
identifying the respective vehicle occupant after prior initialization by
providing at least one data vector of the data vector pair as an input to the respective associated trained neural network via a respective measuring operation carried out each time the respective vehicle occupant reenters the interior of the vehicle, and
identifying the respective vehicle occupant by comparing the at least one output with the respective averaged representations stored in the user accounts.

Yet further described is an identification control device for a robust identification of vehicle occupants, which is configured to carry out a method according to aspects of the invention with the aid of a computer program product according to aspects of the invention.

BRIEF DESCRIPTION OF THE DRAWING

Further advantages and embodiments of the invention will emerge from the description and the accompanying drawing.

It goes without saying that the aforementioned features can be used not only in the respectively specified combination, but also in other combinations or on their own, without leaving the scope of the present invention.

The sole FIGURE shows a calculation scheme for the Deep Canonical Correlation Analysis method in one embodiment of the method according to aspects of the invention.

DETAILED DESCRIPTION OF THE INVENTION

The sole FIGURE shows a calculation scheme 100 for a Deep Canonical Correlation Analysis method, also abbreviated as a DCCA method, in one embodiment of the method according to aspects of the invention. Two identically structured neural networks 113, 123 are used, each of which comprises at least three hidden layers in addition to an input layer and an output layer. Neural networks 113, 123 having such a structure are also referred to as "deep," i.e., "Deep Neural Network" (DNN). A first interior sensor 111 and a second interior sensor 121 provide a respective input 112, 122 for the input layer. A respective output 114, 124 of the respective output layer is presented as a first representation $z_1$ 115 and a second representation $z_2$ 125 with a respective data vector. Both neural networks 113, 123 are determined by a plurality of network parameters, which are adjusted in terms of a target value in a predetermined number of training runs using supervised learning in order to authenticate a respective vehicle occupant from a group of vehicle users in accordance with the invention. The target value is determined by a loss function Loss(corr[$z_1$,$z_2$]) 103 via a result of a canonical correlation analysis 101, which calculates a correlation corr[$z_1$,$z_2$] 102 between representations 115, 125 from a respective input 116, 126. For this purpose, respective gradients 131, 132 are formed for the target value in a backpropagation, by means of which the target value is optimized when the loss function is minimal and the correlation is therefore maximum. As a result, the DCCA method teaches the two neural networks 113, 123 in such a way that the respective representations 115, 125 issued by the respective neural networks 113, 123 as outputs 114, 124 are highly linearly correlated. Accordingly, when the trained neural networks 113, 123 are used productively, a vehicle occupant who is being observed by the respectively functioning second interior sensor or functioning first interior sensor is successfully identified even if a first interior sensor 111 fails or a second interior sensor 121 fails.

LIST OF REFERENCE SIGNS

100 Schematic of the DCCA calculation method
101 Canonical Correlation Analysis (CCA)
102 Correlation
103 Loss function
111 First interior sensor
112 Input to first neural network
113 First neural network
114 Output
115 First representation
116 First input to CCA
121 Second interior sensor
122 Input to second neural network
123 Second neural network
124 Output
125 Second representation
126 Second input to CCA
131 Return first gradient to the first neural network
132 Return second gradient to the second neural network

What is claimed is:

1. A method for robust identification of occupants in a vehicle, wherein the vehicle has a first interior sensor and a second interior sensor that are each disposed in a vehicle interior, said method comprising:
carrying out a Deep Canonical Correlation Analysis to identify a respective vehicle occupant among a group of vehicle users with a first neural network associated with the first interior sensor and a second neural network associated with the second interior sensor, wherein the first neural network and the second neural network have a symmetrical structure comprising at least three hidden layers and are each determined by a plurality of network parameters, wherein a respective data vector from a respective measuring operation of the first interior sensor and the second interior sensor is formed as a respective input for the respective neural network, wherein a respective representation is issued by the respective neural network as a respective output, wherein a loss function is formed via a correlation between the respective representations, wherein the loss function is minimal when the correlation is maximum, (a) wherein, in a first step serving as an initialization, each vehicle occupant from the group of vehicle users is authenticated against the output of the respective neural networks by:
   (i) providing a respective pair of data vectors as a respective input for each vehicle occupant in a predetermined number of training runs by way of a respective simultaneous measuring operation by the first interior sensor and the second interior sensor,
   (ii) optimizing the plurality of network parameters of the respective neural networks with regard to a minimum value of the loss function by way of a gradient-based process, and,
   (iii) after completion of the training runs, recalculating the representations of the output for all data vector pairs with the optimized network parameters, forming a respective averaged representation and storing the respective averaged representation in a user account associated with the respective vehicle occupant, and (b) wherein, in a second step serving as a productive use, the respective vehicle occupant is identified by:
   (i) providing at least one data vector of the data vector pair as an input to the respective associated trained neural network via a respective measuring operation carried out each time the vehicle occupant reenters the interior of the vehicle, and
   (ii) identifying the respective vehicle occupant by comparing the at least one output with the respective averaged representations stored in the user accounts.

2. The method according to claim 1, in which the first interior sensor is selected as a sensor for acquiring image data for the respective vehicle occupant.

3. The method according to claim 2, wherein the first interior sensor is a camera, an infrared camera, or a radar.

4. The method according to claim 1, wherein the second interior sensor is a sensor for acquiring physiological data from the respective vehicle occupant.

5. The method according to claim 4, wherein a physiological characteristic to be acquired by the second interior sensor is selected from the group consisting of: eye-blink observation, heart rate, respiration, breath analysis, holding force exerted on the steering wheel, and seat occupancy detection.

6. A system for robust identification of vehicle occupants, said system comprising:
   a first interior sensor and a second interior sensor disposed in a vehicle interior,
   an identification control device that is configured to carry out a Deep Canonical Correlation Analysis method to identify a respective vehicle occupant among a group of vehicle users with a first neural network associated with the first interior sensor and a second neural network associated with the second interior sensor, wherein the first neural network and the second neural network have a symmetrical structure comprising at least three hidden layers and are each determined by a plurality of network parameters, wherein identification control device is configured to form a respective data vector from a respective measuring operation of the first interior sensor and the second interior sensor as a respective input for the respective neural network, wherein the respective neural network is configured to issue a respective representation as a respective output and the identification control device is configured to form a loss function via a correlation between the respective representations, wherein the loss function is minimal when the correlation is maximum, wherein the identification control device is further configured to, (a) in a first step serving as an initialization, authenticate each vehicle occupant from the group of vehicle users against the output of the respective neural networks by:
   (i) providing a respective pair of data vectors as a respective input for each vehicle occupant from the group of vehicle users in a predetermined number of training runs by means of a respective simultaneous measuring operation by the first interior sensor and the second interior sensor,
   (ii) optimizing the plurality of network parameters of the respective neural networks with regard to a minimum value of the loss function by means of a gradient-based process, and,
   (iii) after completion of the training runs, recalculating the representations of the output for all data vector pairs with the now optimized network parameters, forming a respective averaged representation and storing the respective averaged representation in a user account associated with the respective vehicle occupant and, (b) in a second step serving as a productive use, identifying the respective vehicle occupant by:
   (i) providing at least one data vector of the data vector pair as an input to the respective associated trained neural network via a respective measuring operation carried out each time the vehicle occupant reenters the interior of the vehicle, and
   (ii) identifying the respective vehicle occupant by comparing the at least one output with the respective averaged representations stored in the user accounts.

7. The system according to claim 6, wherein the first interior sensor is a sensor for acquiring image data for the respective vehicle occupant.

8. The system according to claim 7, wherein the sensor for acquiring image data is selected a camera, an infrared camera, or a radar.

9. The system according to claim 6, wherein the second interior sensor is a sensor for acquiring physiological data from the respective vehicle occupant.

10. The system according to claim 9, wherein a physiological characteristic to be acquired by the second interior sensor is selected from the group consisting of: eye-blink observation, heart rate, respiratory activity, breath analysis, holding force exerted on the steering wheel, and seat occupancy.

11. A computer program product comprising a non-transitory computer-readable medium on which a program code that can be executed on a computing unit of an identification control device of a vehicle is stored, wherein, when executed on the computing unit, the program code prompts the computing unit to carry out the following steps based on a Deep Canonical Correlation Analysis method:
   a) forming a first neural network and a second neural network each having a symmetrical structure and at least three hidden layers, each neural network determined by a plurality of network parameters;
   b) assigning a respective data vector from a respective measuring operation of a first interior sensor to the first neural network and a second interior sensor to the second neural network as a respective input;
   c) forming a respective output of the respective neural network as a respective representation;

d) forming a loss function via a correlation between the respective representations, wherein the loss function is minimal when the correlation is maximum;

e) authenticating each vehicle occupant from the group of vehicle users against the output of the respective neural networks within the context of an initialization by:
   (i) providing a respective pair of data vectors as a respective input for each vehicle occupant in a predetermined number of training runs by means of a respective simultaneous measuring operation by the first interior sensor and the second interior sensor,
   (ii) optimizing the plurality of network parameters of the respective neural networks with regard to a minimum value of the loss function by means of a gradient-based process,
   (iii) after completion of the training runs, recalculating the representations of the output for all data vector pairs with the now optimized network parameters, forming a respective averaged representation and storing the respective averaged representation in a user account associated with the respective vehicle occupant, (f) identifying the respective vehicle occupant after prior initialization by:
   (i) providing at least one data vector of the data vector pair as an input to the respective associated trained neural network via a respective measuring operation carried out each time the respective vehicle occupant reenters the interior of the vehicle, and
   (ii) identifying the respective vehicle occupant by comparing the at least one output with the respective averaged representations stored in the user accounts.

* * * * *